United States Patent [19]

Mosse et al.

[11] Patent Number: 5,084,153

[45] Date of Patent: Jan. 28, 1992

[54] ELECTRICAL APPARATUS

[75] Inventors: Richard W. E. Mosse, London; Jan R. Van Der Post, Oxford, both of England

[73] Assignee: Beckswift Limited, London, England

[21] Appl. No.: 601,690

[22] PCT Filed: Apr. 21, 1989

[86] PCT. No.: PCT/GB89/00431

§ 371 Date: Dec. 11, 1990

§ 102(e) Date: Dec. 11, 1990

[87] PCT Pub. No.: WO89/10438

PCT Pub. Date: Nov. 2, 1989

[30] Foreign Application Priority Data

Apr. 25, 1988 [GB] United Kingdom ............... 8809750

[51] Int. Cl.$^5$ .................. C25B 9/00; C25B 15/00; C25C 7/00

[52] U.S. Cl. ................. 204/228; 204/DIG. 7; 204/275

[58] Field of Search ............. 204/DIG. 7, 228, 224 R, 204/275

[56] References Cited

U.S. PATENT DOCUMENTS

| | | | |
|---|---|---|---|
| 1,519,572 | 12/1924 | Wolf | 204/DIG. 7 |
| 2,751,340 | 6/1956 | Schaefer et al. | 204/DIG. 7 |
| 2,859,157 | 11/1958 | Curtiss, Jr. | 204/DIG. 7 |
| 2,859,166 | 11/1958 | Grigger | 204/DIG. 7 |
| 2,908,740 | 10/1959 | Chapman | 204/DIG. 7 |
| 3,567,595 | 3/1971 | Yates | 204/DIG. 7 |
| 4,420,382 | 12/1983 | Riedl | 204/DIG. 7 |
| 4,879,007 | 11/1989 | Wong | 204/DIG. 7 |

Primary Examiner—Donald R. Valentine
Attorney, Agent, or Firm—Cushman, Darby & Cushman

[57] ABSTRACT

The maximum acceptable operating current of an electrode immersed in an electrically conductive liquid is increased by providing at least one shield member in front of the electrode and serving to reduce the current density at the part or parts of the electrode where current density would otherwise be highest.

12 Claims, 4 Drawing Sheets

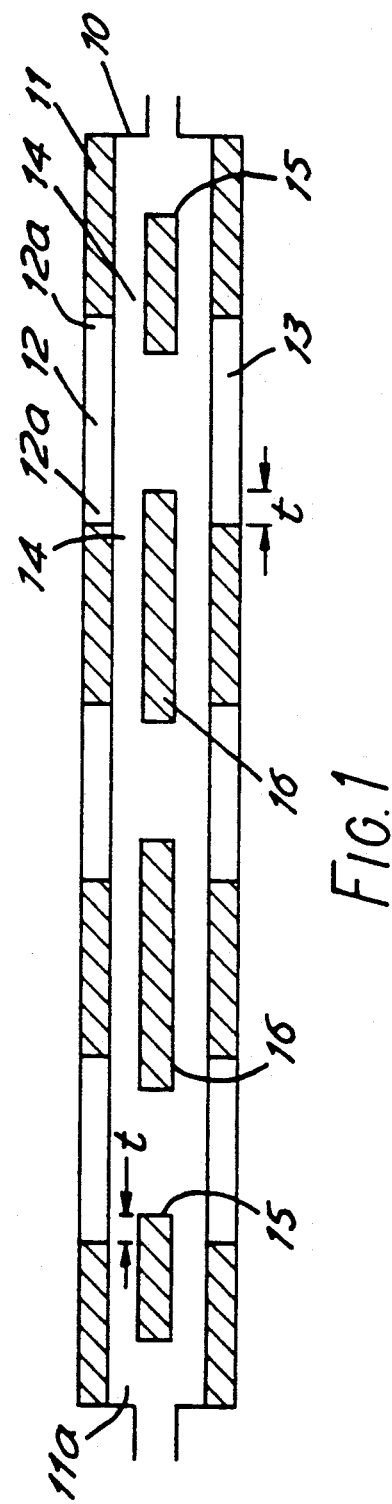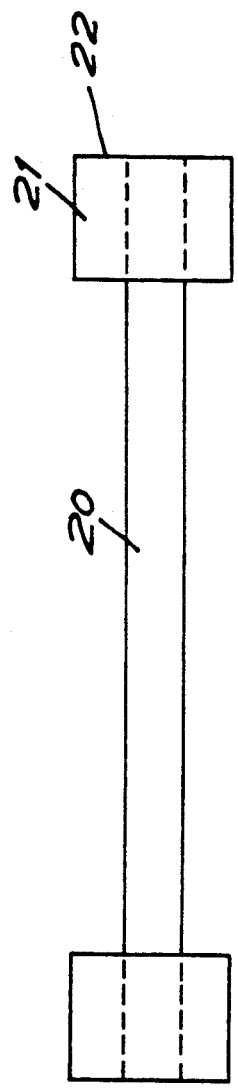

ELECTRICAL APPARATUS

BACKGROUND OF THE INVENTION

The present invention relates to electrical apparatus of the kind having an electrode having an area exposed to current flow through a conductive medium, e.g. a conductive liquid, which may or may not contain solids. Such a conductive medium will be referred to herein as an "electrolyte" for convenience irrespective of the mode of conduction in the liquid and of whether any electrolysis occurs. Such an arrangement is found in electrical apparatus intended for many different purposes, for instance ohmic heating apparatus, electrolysis apparatus and electrical batteries.

The performance of such apparatus is often limited by the maximum current density which the electrode can sustain. It is often found that the current density is not constant over the whole of the surface area of the electrode exposed for current flow but tends to increase substantially at certain parts of the electrode, typically at the edges of the electrode. This may be because additional current paths are provided by a volume of electrolyte situated laterally beyond the edges of the electrode or may be due to the shape of the electrode. In order to keep the maximum current density to which any part of the electrode is subjected down to an acceptable level, the bulk of the surface area of the electrode has to be operated at a current density which is considerably less than would be preferred.

In some ohmic heating cases it may be possible to avoid this problem by increasing voltage rather than current so that the desired heating power can be obtained at a permissible current density. However, increasing voltage may cause problems such as operator safety, or damage by arcing. Unless means for limiting the current are included higher voltages will themselves lead to higher currents passing in a given system. The use of current limiting factors may in itself cause problems.

It may be possible to increase electrode size but this may cause problems. Electrode materials are frequently expensive, e.g. incorporating precious metal coatings and in some forms of apparatus size may be inherently undesirable. For instance, in ohmic heaters used for heating foodstuffs, the use of a large electrode area implies the use of large heating chambers. This in turn makes rapid heating more difficult. Slow heating is undesirable because of the consequent loss of flavour, vitamins, texture or other factors affecting quality through long exposure of foodstuffs to heat.

It would be desirable therefore to provide some means for limiting the increase of current density at particular areas, e.g. towards the edges, of the electrode in such apparatus.

It has been proposed previously, e.g. in GG-A-526238 and U.S. Pat. No. 2,584,654, to vary the proportion of the area of an electrode immersed in an electrolyte which is effective in passing current by positioning a moveable shield member between the electrode and a counter electrode. Movement of the shield member to expose a varying amount of the electrode to current flow may be used to control the gross current flow through the apparatus. The aim of the shield member in such systems is not to control current density at particular locations on the electrode but simply to limit the overall current flow so that with the shield member in place, the apparatus operates substantially below its maximum current capability.

SUMMARY OF THE INVENTION

The present invention provides electrical apparatus comprising an electrode having an area exposed for current flow, and a shield member in a fixed relationship with the electrode, said shield member being thin relative to the length of the current path in the apparatus and being so positioned with respect to the electrode as to reduce current density at the part or parts of the electrode surface which in the absence of the shield member would experience the highest current density, the shield member thereby serving to increase the current carrying capacity of the electrode.

Electrodes in apparatus according to the invention may have a wide variety of shapes including plate-like, cylindrical or spherical. The areas on the electrodes which would normally experience the maximum current density will depend on the electrode shape and sometimes on the nature of the counter electrode with which the electrode defines a current path. The current density maximum may occur at the closest approach of the electrode to the counter electrode, where current paths are shortest. Often it will occur at an edge of the electrode where electrolyte outside of the direct path between the electrode and its counter electrode provides additional current paths. Generally, the shield member will be positioned between the electrode and its counter electrode, overlying that area of the electrode surface which would otherwise suffer the greatest current density. By restricting the current density at these areas relative to the rest of the electrode surface, paradoxically the current carrying capacity of the system can be increased. The average current density can be raised without the maximum current density exceeding permitted limits.

By the presence of the shield member, apparatus according to the invention is enabled to operate at higher overall currents than otherwise. This is in contrast to the effect of movable shields used to restrict current in known devices.

Preferably the shield member extends face to face with and spaced from the shielded area of the electrode.

Preferably, the shield member extends substantially beyond the area of the electrode to be shielded.

The thickness of the shield member is preferably less than 10% of the said current path, e.g. more preferably less than 5%, e.g. from 0.1 to 2%. The shield member is preferably so configured as not to cause any substantial obstacle to liquid electrolyte flow transverse to the direction of current flow.

In preferred embodiments, the present invention provides electrical apparatus comprising an electrode, having an area thereof exposed for current flow, a counter electrode, means maintaining the electrode and counter electrode in a spaced relationship, means for containing an electrolyte to occupy the space between the electrode and counter electrode such that the electrolyte extends laterally beyond at least one edge region of the area of the electrode exposed for current flow, and an electrically insulative shield member fixedly disposed between the electrode and the counter electrode in a spaced, generally face to face relationship with a or the said edge region of the electrode within said means for containing the electrolyte, said shield member serving to obstruct partially the passage of electric current in use between the said edge region of the electrode area exposed for current flow and the counter electrode.

Preferably, the electrode and counter electrode are disposed in a face to face relationship.

Preferably, the shield member overlaps the said edge region of the electrode area exposed for current flow, i.e. extends both laterally beyond said edge region outside the said electrode area and laterally towards the middle of the electrode.

Preferably, the electrode and counter electrode are disposed in a face to face relationship.

Preferably, the shield member overlaps the said edge region of the electrode area exposed for current flow, i.e. extends both laterally beyond said edge region outside the said electrode area and laterally towards the middle of the electrode.

Preferably the shield member overlaps the edge region of the electrode area exposed for current flow by a distance which is from 10 to 300% of the spacing between the electrode and the counter electrode.

More preferably, said overlap is from 10 to 100%, more preferably 20 to 50% of said spacing, for instance about 30%.

The shield member preferably extends outwardly beyond the electrode area exposed for current flow by a distance at least as great as the spacing between the electrode and the counter electrode, more preferably by at least twice said spacing, for instance by at least four times said spacing.

The electrode may be of any shape and may present any number of edges or any shape of edge. Shield members may preferably be provided overlapping any edge of the electrode bordered by electrolyte.

The apparatus may be provided with a pair of said shield members, each disposed between the electrode and the counter electrode in a spaced, face to face relationship with the electrode and each extending over a respective one of two oppositely disposed edge regions of the electrode area exposed for current flow and each serving to obstruct partially the passage of electric current in use between the respective said edge region and the current electrode.

The apparatus may include a further said shield member disposed between the electrode and the counter electrode in a spaced face to face relationship with the electrode and extending over a third edge region of the electrode area exposed for current flow, which third edge region connects between the two said oppositely disposed edge regions, said further shield member serving to obstruct partially the passage of electric current in use between the said third edge region and the counter electrode.

The first, second and third mentioned shield members may be integral with one another.

The apparatus may include a second further said shield member disposed between the electrode and the counter electrode in a spaced face to face relationship with the electrode and extending over a fourth edge region of the electrode area exposed for current flow, which fourth edge region connects between the two said oppositely disposed edge regions and is opposite to said third edge region, said second further shield member serving to obstruct partially the passage of electric current in use between the fourth said edge region and the counter electrode.

The fourth shield member may be integral with the first, second and third mentioned shield members.

The shield member therefore may comprise a plate having an aperture therein to overlie the central region of the electrode.

In some cases it may be preferred that the or each shield member is positioned substantially midway between the electrode and the counter electrode.

However, the or each said shield member may be positioned nearer to the electrode than to the counter electrode and, optionally, for the or each said shield member associated with the electrode, a corresponding shield member may be provided for the counter electrode, the arrangement of shield members being substantially symmetrical about the mid point between the electrode and the counter electrode. This would generally be preferred when the inter electrode spacing is large in relation to the electrode dimensions.

Where the electrode is planar, preferably the or each shield member is a substantially planar member.

An alternative preferred electrode/counter electrode configuration is one where a first of the electrode and the counter electrode is a rod or tube having an external cylindrical electrode surface and the other of said electrode and counter electrode is tubular and concentrically overlies the first presenting an internal cylindrical electrode surface. An anular space is thereby provided to be occupied by electrolyte. At the end of the electrode and counter electrode a cylindrical shield member of a diameter intermediate that of the electrode and that of the counter electrode and of relatively small wall thickness may be provided, overlying the end region of the electrode. A number of such electrode and counter electrode pairs may be provided spaced longitudinally from one another. The electrode or counter electrode which is outermost of the two may preferably form a tubular containment vessel for an electrolyte or may line the wall of such a vessel.

Such an arrangement provides a substantially unobstructed flow path for liquid electrolyte through the annular space between the electrodes.

Generally speaking, whilst it is desirable that the shield member be relatively thin, the degree of thinness of the shield member in the between electrodes direction will not be critical. However, the shield member may have to sustain substantially all of the voltage applied to the cell and must therefore have sufficient dielectric strength to stand the voltage in question.

For many forms of apparatus, the electrode and counter electrode preferably have substantially planar working surfaces which are substantially parallel to one another and to the or each shield member.

However, particularly in cathodic protection apparatus or in grounding electrodes, the electrode may be a bar-shaped electrode and the shield member may take the form of a collar substantially surrounding the end region of the electrode area exposed for current flow. The shield member may overlap the end region of the electrode area exposed for current flow. Similar shield members may be provided around joints in the electrode, which otherwise would tend to be areas of high current density.

The shield member may be provided with a closure portion which may be integral with the remainder of the shield member and which closes said collar over the end region of the electrode area. For instance, the shield member may take the form of a cup having a base and side walls positioned over the end of a bar shaped electrode which is received with clearance within the side wall.

Preferably, a pair of said shield members will be provided, one at each end of the electrode in those cases where the electrode is wholly contained in the electrolyte.

The effect of the shield member should be to make more uniform the current density at the electrode and in particular to reduce the current density at the edge which is shielded.

Depending on the nature of the apparatus, the maximum current density at the edge may be restricted to no greater than twice the average current density when the apparatus is in use, in some cases to no greater than 1.5 times, and in some cases to as low as 0.65 times the average.

The apparatus may include means for applying a potential difference across said electrode and counter electrode, which may be means for applying an alternating potential difference or a constant potential difference.

The apparatus may comprise a plurality of sets of said electrodes and counter electrodes.

The apparatus may be such that the electrodes and counter electrodes share an electrolyte in common.

The means for containing the electrolyte may be a tubular member having a plurality of said electrodes disposed in a longitudinally spaced relationship along an internal surface thereof and a corresponding plurality of said counter electrodes disposed in a similar longitudinally spaced relationship there along, e.g. along an internal surface thereof or extending along a central axis thereof, facing said electrodes.

The apparatus may be ohmic heating apparatus.

Alternatively, the apparatus may be for electrolysis, electro-winning, electrostripping, electroplating, electroforming, electrochlorination, or may be an electrical primary or secondary battery, an electrical display device, for instance an electrochromic device, a liquid crystal device, or an electroluminescent device or may be a cathodic protection installation or a liquid pumping device.

The invention includes a sacrificial anode for use in cathodic protection which anode is bar shaped and has an electrically insulative shield member in the form of a collar substantially surrounding each end of the electrode. Each shield member may be provided with a closure portion closing each said collar across the respective end of the electrode.

In a further aspect the invention includes electrical apparatus comprising an electrode, having an area thereof exposed for current flow, a counter electrode, spaced from the electrode, an electrolyte occupying the space between the electrode and counter electrode such that the electrolyte extends laterally beyond at least one edge region of the area of the electrode exposed for current flow, and an electrically insulative shield member fixedly disposed between the electrode and the counter electrode within the electrolyte in a spaced, generally face to face relationship with the said edge region of the electrode and serving to obstruct partially the passage of electric current in use between the said edge region of the electrode area exposed for current flow and the counter electrode.

Such apparatus may in particular be a cathodic protection installation. The counter electrode may be an object to be protected and the electrolyte may be a liquid, such as water, with which both the electrode and said object are in contact.

BRIEF DESCRIPTION OF THE DRAWINGS

The invention will be described with reference to preferred embodiments illustrated in the accompanying drawings in which:

FIG. 1 is a schematic longitudinal cross-section (not to scale) through an ohmic heating apparatus according to the invention;

FIG. 4 is a side view of an electrode for use in cathodic protection according to the invention;

DESCRIPTION OF THE PREFERRED EMBODIMENTS

Figure 2:
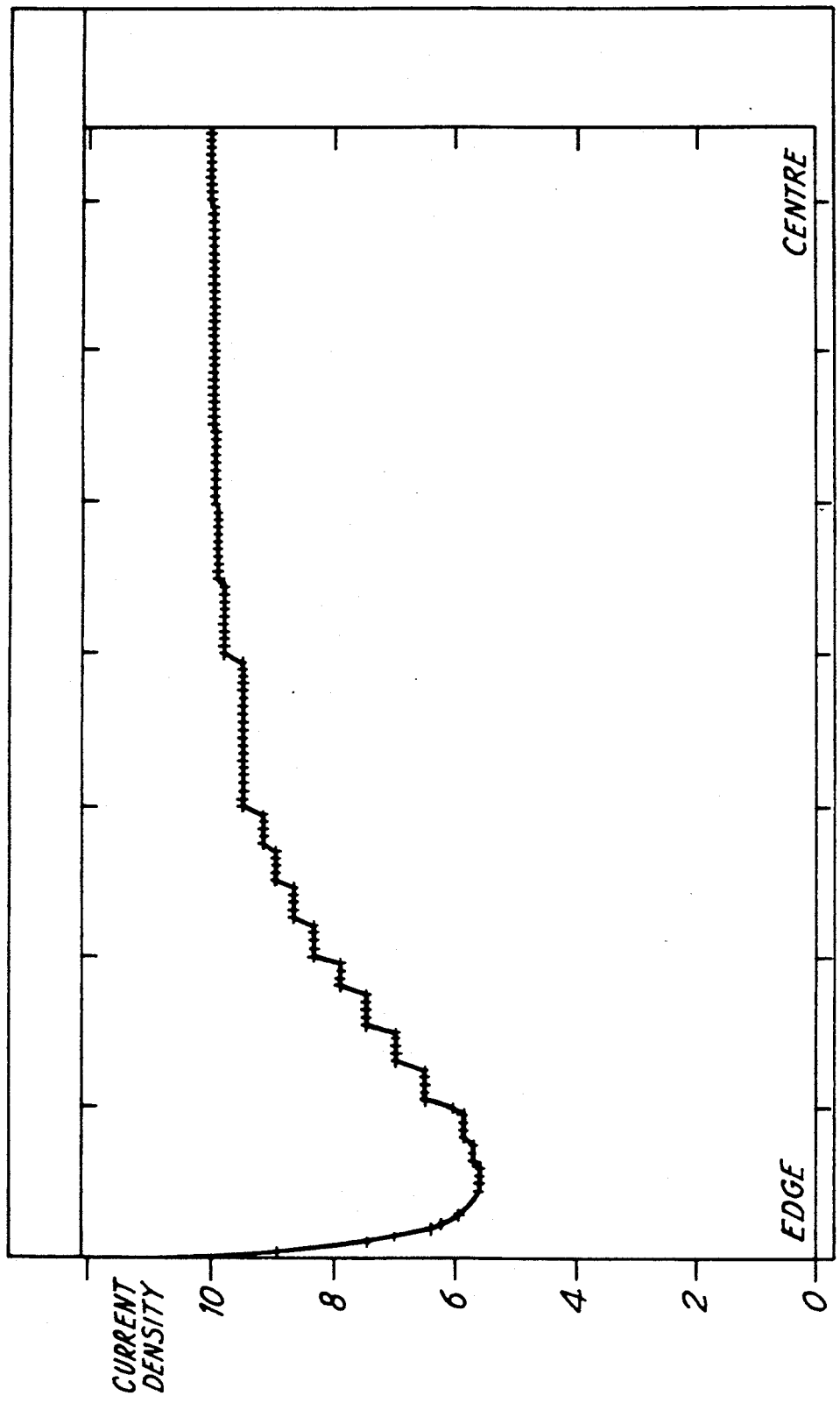
FIG. 2 is a graph illustrating the effect of the invention in limiting current density at the edge of an electrode.

FIG. 1 shows a longitudinal cross-section, the heating chamber of ohmic heating apparatus 10 having a first pair of opposed insulating side walls 11 into which are set at intervals on one face thereof three electrodes 12 and on an opposite face thereof three counter electrodes 13. A second pair of opposed insulating side walls 11a serves to space side walls 11 to define the said heating chamber. The heating chamber is of square cross-section and the electrode and counter electrodes are identical to one another.

In use, the interior of the chamber is filled with a fluid to be heated such as water, milk or a flowable foodstuff material which serves as an electrolyte to complete a current path between the electrodes 12 and the counter electrodes 13. The nature of the heating chamber is such that the electrolyte extends laterally beyond the transversely running edges of the electrodes into areas 14.

To prevent excessive current density in the edge portions of the electrodes and counter electrodes in use, the apparatus is provided with shield members 15 and 16. These are of insulating material of sufficient dielectric strength to resist the voltage to be applied to the apparatus in use. The shield members 15 are positioned at the ends of the heating chamber overlap the edges of the electrodes 12 and the counter electrodes 13 so as to extend over the electrode and counter electrode concerned by a distance t which is approximately 30% of the spacing between the electrode and the counter electrode. The shield member 15 extends away from the electrode and counter electrode concerned by a distance which is approximately the same as the spacing between the electrode and the counter electrode.

Between successive pairs of electrodes there are positioned shield members 16 which overlap with each of two electrodes 12 by a distance t. The shield members 16 extend beyond the edge of each electrode 12 away from the electrode by a distance which is over twice the spacing between the electrode and the counter electrode. The shield members serve to obstruct current flow from the edge regions 12a of the electrodes 12.

The thickness of the shield members 15, 16 seen edge on in FIG. 1 is exagerated. In practice the shield members in this embodiment take the form of thin plates of insulating material having a thickness of about 1% of the inter-electrode spacing.

It will be appreciated that in a system such as the one described in which there is more than one pair of electrode and counter electrode, additional current paths are presented between successive electrodes when alternating voltage is applied to the electrodes and counter electrodes of the apparatus. Thus, current can flow not only between the electrode 12 and its corresponding counter electrode 13 but also between successive electrodes 12 if there is any voltage difference between them as there will be if different phases of a multi-phase supply are applied to the electrodes. The shield members 16 help to prevent excessive current density at the edges of the electrodes 12 and counter-electrodes 13.

FIG. 2 is a graph schematically indicating the current density as determined by a computer simulation from the centre of an electrode 12 to its edge in the presence of a shield member overhanging the edge by a distance t. The graph is a simplification in that the computer simulation used considers only a two dimensional slice through the electrode. In the graph shown in FIG. 2, the distance t is taken to be 3 cm, 20 cm and the separation between each electrode 12 and the corresponding counter-electrode 13 is taken to be 10 cm.

The maximum current density is about 1.2 times the current density at the electrode centre. In the absence of the shield member the ratio would be substantially greater.

Figure 3:
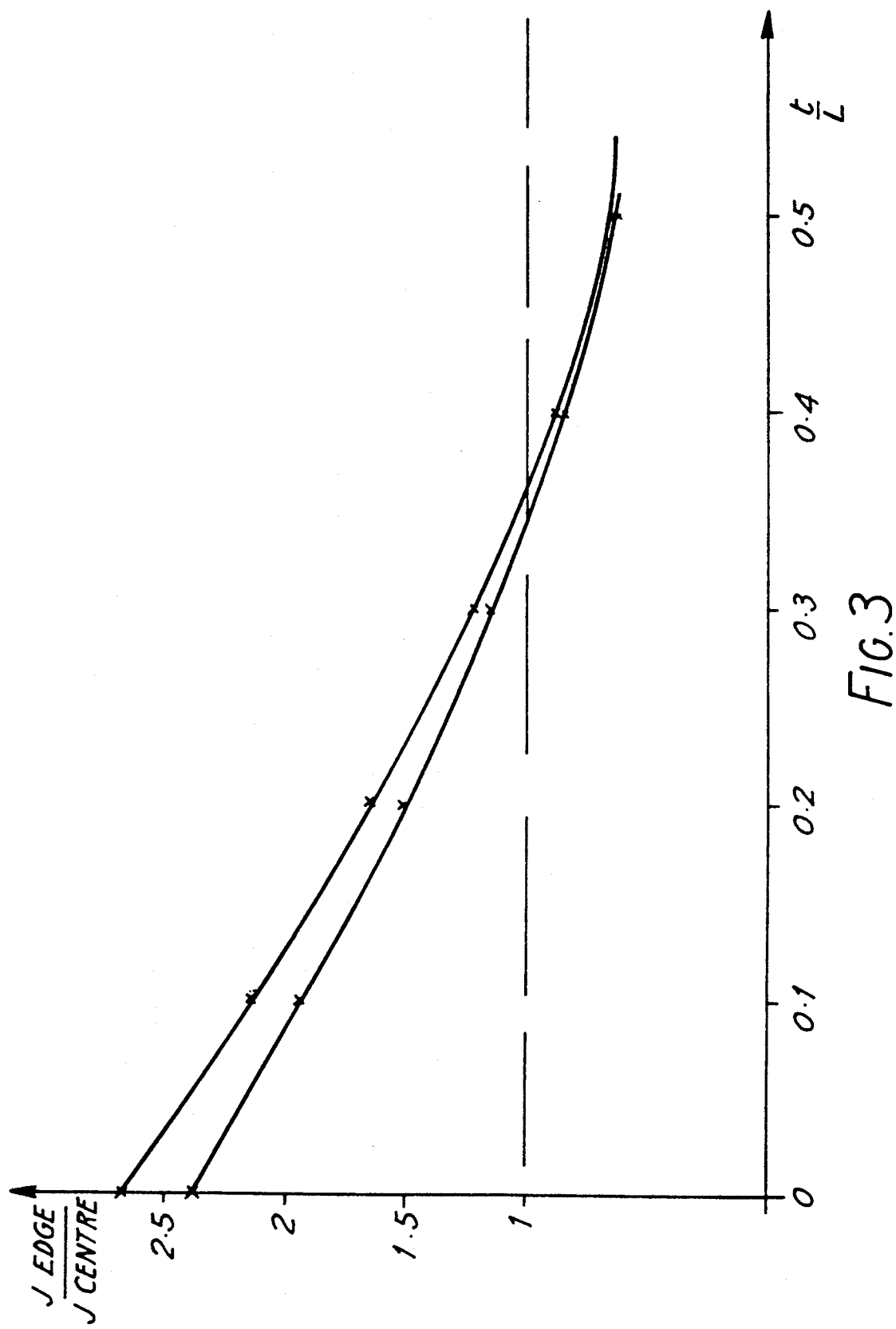
FIG. 3 is a graph illustrating the variation in uniformity of current density with the placing of a shield member.

FIG. 3 shows two plots of the ratio between the current density at the edge (J edge) and the current density at the centre (J centre) against the ratio of the overlap distance t and the inter-electrode spacing L. The upper plot is for an inter-electrode 12 spacing of 5 cm and an electrode to counter electrode spacing L of 15 cm. The lower plot is for an inter-electrode 12 spacing of 40 cm and an electrode to counter electrode spacing of 15 cm.

It can be seen that the evening out of the current density across the electrode depends mainly upon the degree of overlap t between the shield member and the electrode and very little upon the spacing between the electrodes 12.

FIG. 4 shows a sacrificial anode according to the invention comprising a bar shaped electrode 20 equipped at each end with a cup shaped shield member 21 having a base 22 and a circumambient wall extending from the base toward the centre of the electrode and spaced from the electrode surface. In the use of such a sacrificial anode, the apparatus to be protected will constitute the counter electrode of electrical apparatus according to the invention and the conductive medium in which the apparatus to be protected is situated will constitute the electrolyte.

Figure 5:
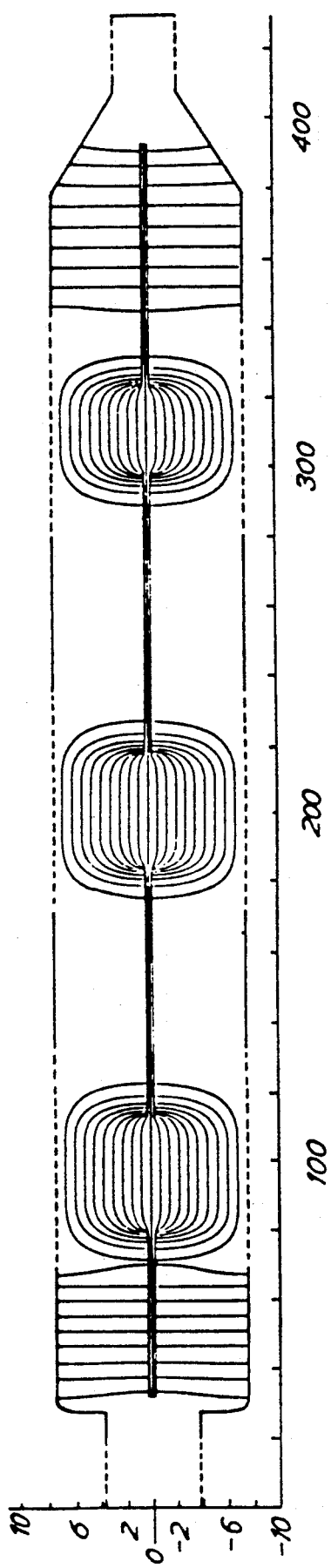
FIG. 5 is an isopotential plot for apparatus generally of the kind shown in FIG. 1.
Figure 6:
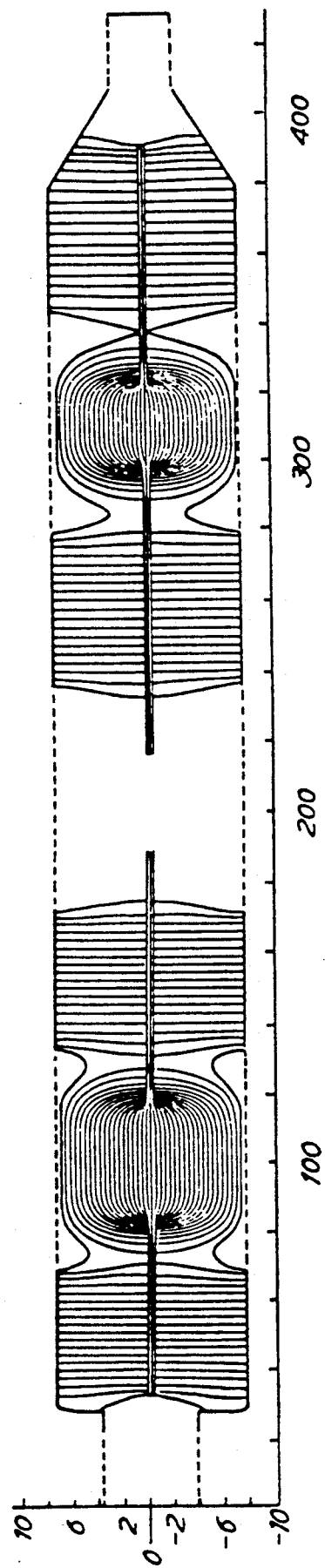
FIG. 6 is an isopotential plot similar to that of FIG. 5 but for different operating conditions.

The effect of the use of the shield members described above in apparatus of the kind schematically shown in FIG. 1 is further illustrated in FIGS. 5 and 6 which are plots of isopotentials produced by computer simulation. FIG. 5 indicates that in normal use there ill be virtually no current flow between electrodes on the same side of the pipe means and that the ratio between the maximum current density at any electrode and the average current density will be about 1.5. This will mean that the average current density may be much higher than would be the case in the absence of the shields without the edge current density becoming excessive. The heating effect is greatest where the isopotentials are closest and it can be seen that the heating effect will therefore be greatest along the central axis of the heater. Since the flowable material is likely to flow fastest along the central axis, this current distribution is likely to result in more uniform heating. Furthermore, the positioning of the shield members along the central axis will itself tend to reduce the flow rate along the centre of the pipe means, once again helping to produce uniform heating.

FIG. 6 illustrates the condition which may momentarily arise when current is switched off at the centre electrodes. The plot indicates that there is not excessive current flowing between the upstream and downstream electrodes respectively and the central pair of electrodes and also indicates that the maximum current density at the upstream and downstream pairs of electrodes is even under these conditions not excessive in proportion to the average current density.

Both plots indicate that there will be virtually no current flow to the neutral electrodes at the end of the pipe means.

Many modifications and variations of the invention as described above are possible within the general scope of the invention. The shield member characteristic of this invention may be incorporated into ohmic heating apparatus of the kind described in our British Patent Specification No. 8,716,673 and may be used in conjunction with electrodes of the kind described in our British Patent Application No. 8,725,866.

A number of other conformations of electrodes and shields will readily occur to those skilled in the art.

The flat electrodes and shields principally illustrated herein may be replaced by tubes or conical sections, such as would arise if one viewed the arrangement of electrodes and counter-electrodes shown in FIG. 1 as being shown in half section with a centre line lying parallel to or obliquely to the axis of the arrangement presently shown.

We have described above an arrangement in which a rod electrode is shielded at each end by a tubular shield arrangement extending beyond the rod. A number of rods and shields may be combined in a two dimensional parallel array (like the nails in a bed of nails) with alternate ones being of opposite polarity to produce an electro-chemical effect.

In an electro-galvanizing plant in which a coil of steel is passed around a roller in a plating bath and acts as an electrode, shield members might be provided for each edge of the web in the form of curved plates overlying the edges of the web but spaced therefrom to allow free circulation of liquid.

Another alternate conformation would involve two flat metal ring electrodes, each mounted on the face of an insulating base, set in a face to face parallel or converging position. A conductive liquid may flow radially inwards or outwards to or from a centre tube running in on the axis of one of the electrodes. The shield members may be two rings of insulator, one overlapping the outer edge of the electrodes and one the inner. For heating the liquid, the interelectrode distance may be varied in the direction of liquid flow to obtain a desired heating pattern by varying the resistence time and current density to take account of changes in conductivity with temperature.

We claim:

1. Electrical apparatus comprising:
   an electrode and a counter electrode, each having an area exposed for current flow;
   flow path means for defining a flow path of a liquid through said electrical apparatus and over said electrode and counter electrode; and shield means for increasing the current carrying capacity of the electrode and counter electrode by reducing current density at parts of the electrode surface and counter electrode surface which in the absence of the shield means would experience the highest current density; said shield means comprising at least one shield member in a fixed relationship with the electrode and counter electrode, said at least one shield member being thin relative to the length of the current path in the electrical apparatus.

2. Electrical apparatus as claimed in claim 1, wherein said at least one shield member extends face to face with and is spaced from an are of the electrode to be shielded.

3. Electrical apparatus as claimed in claim 1, wherein said at least one shield member is spaced from and extends substantially beyond an area of the electrode to be shielded.

4. Electrical apparatus as claimed in claim 1, wherein said at least one shield member is fixedly disposed between the electrode and counter electrode in a spaced, generally face to face relationship with an edge region of the electrode area exposed for current flow.

5. Electrical apparatus as claimed in claim 4, wherein said at least one shield member overlaps said edge region of the electrode area exposed for current flow.

6. Electrical apparatus as claimed in claim 5, wherein said at least one shield member overlaps said edge region of the electrode area exposed for current flow by a distance which is from 20% to 50% of the spacing between the electrode and counter electrode.

7. Electrical apparatus as claimed in claim 5, wherein said at least one shield member extends outwardly beyond the electrode area exposed for current flow by a distance at least as great as the spacing between the electrode and counter electrode.

8. Electrical apparatus as claim 4, wherein said flow path means comprises a tubular member having a plurality of said electrodes disposed in a longitudinally spaced relationship along an internal surface of said tubular member, and a corresponding plurality of said counter electrodes facing said electrodes disposed in a longitudinally spaced relationship along the internal surface of said tubular member.

9. Electrical apparatus as claimed in claim 1, wherein the flow path of said liquid through said electrical apparatus is transverse to the direction of current flow.

10. Electrical apparatus as in claim 1, wherein the shield member allows liquid to flow over said electrode and counter electrode.

11. Electrical apparatus comprising:
an electrode and a counter electrode, each having an area exposed for current flow;
flow path means for defining a flow pat of a liquid through said electrical apparatus and over said electrode and counter electrode; said flow path means comprising a tubular member having a plurality of said electrodes disposed in a longitudinally spaced relationship along an internal surface of said tubular member, and a corresponding plurality of said counter electrodes, facing said electrodes, also disposed in a longitudinally spaced relationship along the internal surface of said tubular member;
shield means for increasing the current carrying capacity of the electrode and counter electrode by reducing current density at parts of the electrode surface and counter electrode surface which in the absence of the shield means would experience the highest current density; said shield means comprising a plurality of shield members fixedly disposed between each electrode and its respective counter electrode in a space, generally face to face relationship with an edge region of the electrode area exposed for current flow; said shield member being thin relative to the length of a current path in the electrical apparatus.

12. Electrical apparatus comprising,
an electrode and counter electrode, having an area exposed for current flow;
spacer means for maintaining the electrode and counter electrode in a spaced relationship;
containing means for containing a liquid to occupy the space between the electrode and counter electrode such that the liquid extends laterally beyond edge regions of the areas of the electrode and counter electrode exposed for current flow;
passing means for passing said liquid through said containing means to flow over said electrode and counter electrode; and
an electrically insulated shield member fixedly disposed between the electrode and the counter electrode in a spaced, generally face to face relationship with said edge regions of the areas of the electrode and counter electrode exposed for current areas of the electrode and counter electrode exposed for current flow; said electrically insulated shield member partially obstructing the passage of electric current at said edge regions of the electrode and counter electrode exposed for current flow.

* * * * *

UNITED STATES PATENT AND TRADEMARK OFFICE
CERTIFICATE OF CORRECTION

PATENT NO. : 5,084,153
DATED : January 28, 1992
INVENTOR(S) : MOSSE, Richard W. E., et al.

It is certified that error appears in the above-identified patent and that said Letters Patent is hereby corrected as shown below:

Col. 9, claim 2, line 3, change "are" to -- area --.
Col. 10, claim 11, line 4, change "pat" to -- path --;
line 22, change "space" to -- spaced --.
claim 12, lines 45 and 46, delete word duplication as follows:
"areas of the electrode and counter electrode
exposed for current".

Signed and Sealed this

Fifteenth Day of June, 1993

Attest:

MICHAEL K. KIRK

*Attesting Officer*  *Acting Commissioner of Patents and Trademarks*